Aug. 18, 1936. F. C. LUNNON ET AL 2,051,493
MODULATED CARRIER WAVE TRANSMITTER
Filed July 3, 1933
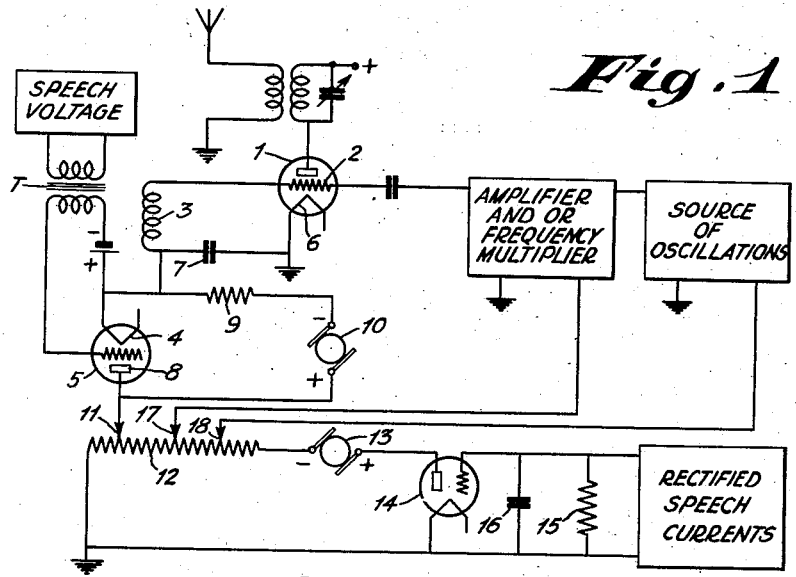
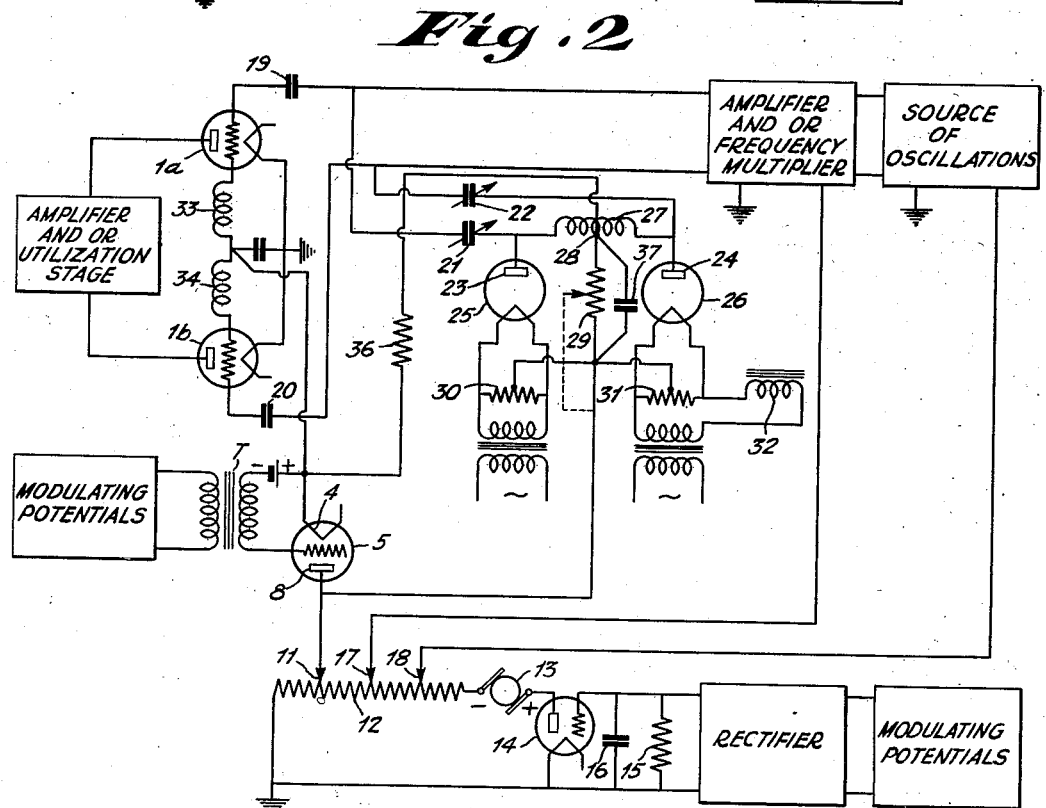
INVENTORS:
FREDERICK CHARLES LUNNON.
EDWARD HERBERT TRUMP.
BY
ATTORNEY Patented Aug. 18, 1936

2,051,493

UNITED STATES PATENT OFFICE 2,051,493

MODULATED CARRIER WAVE TRANSMITTER

Frederick Charles Lunnon and Edward Herbert Trump, Chelmsford, England, assignors to Radio Corporation of America, a corporation of Delaware Application July 3, 1933, Serial No. 678,860
In England July 14, 1932

8 Claims. (Cl. 179—171)

This invention relates to radio and other modulated carrier wave transmitters.

In the well known commonly employed so-called grid direct current modulation circuit arrangements, i. e., arrangements wherein the discharge space of a modulation tube to which modulation potentials are applied is included in the direct current grid circuit of the main tube, i. e., the high frequency tube to be modulated, the amplitude of the driving voltage applied to the main tube is fixed and the grid bias thereof is varied at modulating frequency, the anode voltage remaining constant. This grid bias variation is, however, not controlled directly by the modulating voltage but indirectly by modulation of the "grid leak resistance" in the grid circuit of said main tube and therefore the resulting bias, the product of grid current times "grid leak resistance", will depend upon the grid current characteristic of said main tube, i. e., upon the shape of the curve produced by plotting grid current, as measured by a direct current instrument as ordinates, against grid bias voltage as abscissa when the driving voltage remains constant.

The degree of modulation obtainable by varying the "grid leak resistance" depends on the relative values of the minimum and maximum obtainable anode input to the tube of the modulated stage. By "minimum and maximum obtainable anode input" is meant the range through which the anode current drawn by the modulated stage may be varied by the modulating potential variations.

The minimum anode input is obtained when the "leak resistance" has its maximum resistance value in which case the grid bias of the modulated tube will be approximately equal to the peak value of the driving voltage and the grid of the modulated tube will then be driven only very slightly positive.

The maximum anode input is obtained when the "grid leak" resistance has its minimum value, this value of resistance being that which would be used for a fixed value of "grid leak" resistance if the transmitter were being used as a telegraph transmitter. In this case the grid of the modulated tube will be driven well positive at the anode energy of the modulating tube. The degree of modulation will be small if the minimum anode input is a large proportion of the maximum anode input and this state of affairs may arise from either or both of two causes, namely:

(1) The use of an amplifier tube of low amplification operating at an anode voltage such that the anode input is high when the grid is driven just positive and;

(2) The use of an amplifier tube having sufficient secondary grid emission to cause the direct current grid current to fall to zero while the grid is being driven well positive.

In practice the second cause is usually the most serious and may easily be so serious that practically no variation of anode input can be obtained by increasing the "grid leak resistance". What usually happens in such cases is that the anode input is reduced only very slightly as the "grid leak resistance" is increased to quite high values and then suddenly it falls to a low value in a discontinuous manner; in extreme cases the grid current may reappear positive or negative after first falling to zero as the grid leak resistance is still further increased, so that the grid bias, i. e., the product of "grid leak resistance" and grid current, does not increase steadily with increasing grid leak resistance and this is reflected in the anode input.

The net result is that the direct current grid method of modulation, in its simplest form, cannot be used with an amplifier tube having such characteristics.

These difficulties, which are known, may be obviated by providing a separate source of direct current potential in series with a resistance across the "variable grid leak" of the amplifier tube. In practice, of course, this "variable grid leak" is constituted by the anode-cathode resistance of a triode to whose grid the modulating voltages are applied. The series resistance is chosen at some convenient mean value between the maximum and minimum values of the resistance of the modulating tube corresponding respectively with the negative and positive half-cycle peaks of modulating voltage. With such an arrangement when the modulating tube resistance is almost infinite the full potential of the direct current source is applied to the amplifier grid and the amplitude of this potential is chosen such that the amplifier anode input is reduced to zero. When the modulating tube resistance is at its lowest value, the direct current potential applied to the amplifier grid from the direct current source is almost negligible, as the fixed resistance has then a value of some ten times or more of the resistance of the modulating tube. Under this particular condition, therefore, the bias of the amplifier grid is determined almost entirely by the values of the grid current and of the modulating tube resistance. At this end of the modulation characteristic the amplifier grid is being driven heavily positive and, therefore, secondary emission troubles are unimportant.

The conditions which obtain at both extremes of resistance of the modulating tube have now been explained, and for all intermediate values it is sufficient to say that in practice the balance between bias derived from the product of grid current and modulating tube resistance and bias derived from the separate direct current source gradually changes over as the modulating tube resistance changes, and the final effect is that of a modulation characteristic of satisfactory form and substantially rectilinear over a desired range is obtained whatever may be the grid and anode characteristics of the modulated amplifier tube.

For further information as regards a modified and improved direct current grid modulation system as just described, reference is directed to the specification accompanying the co-pending British application No. 2,286/32. See also Lunnon et al, U. S. patent application No. 623,750, July 21, 1932.

Our previous British Patent No. 351,051 described a so-called absorber keying system in which there is utilized as an absorber tube during spacing periods, a tube which during marking periods functions as an amplifier. The system shown in British Patent No. 351,051 has also been disclosed in Lunnon's U. S. application No. 520,587, March 6, 1931, U. S. Patent No. 1,938,631, issued Dec. 12, 1933. For the purpose of brief description in the present specification such an absorber system will be herein referred to as an auto absorber system.

The present invention may be regarded as providing an arrangement wherein the advantages of both the auto absorber systems and the improved direct current grid modulation systems hereinbefore referred to may be secured in a single transmitter, or to put the matter in another way, the present invention may be regarded as avoiding a difficulty which arises when both the said systems hereinbefore described are incorporated in a single transmitter.

In order that the difficulty which the present invention avoids may be clearly understood, consider the case of a transmitter incorporating both the systems hereinbefore described. Such a transmitter would, as shown in the accompanying Figure 1, comprise an amplifier tube 1 having an earthed cathode and to whose grid circuit the high frequency oscillations to be modulated are applied, the grid 2 of this tube being connected through a grid coil or choke 3 to the cathode 4 of a modulating tube 5, to whose grid circuit speech voltages, for example, are applied, e. g., through a transformer T.

The grid choke 3 serves to maintain the high frequency driving voltage on the grid 2 of the valve 1 and in conjunction with the bi-pass condenser 7 to prevent the application of high frequency driving voltage to the modulating tube 5 and associated apparatus.

The lower end of the grid choke 3 is connected to the cathode 6 of the tube 1 through a bi-pass condenser 7 and the cathode 4 is connected to the anode 8 of the modulating tube 5 through a resistance 9 and a source of potential 10 in series, the negative terminal of this source being towards the cathode. The anode 8 of the modulating tube 5 is connected to a tapping point 11 upon a potentiometer resistance 12 which is connected at one end to earth and at the other end through a further source of potential 13, and the anode cathode space of a keying or control tube 14 to earth. Across the grid circuit of the keying or control tube is a time control circuit consisting of a resistance 15 shunted by a condenser 16 and rectified speech voltages are applied to the grid circuit of the said keying or control tube across the time control circuit. Further tapping points 17, 18 upon the potentiometer resistance 12 are connected to the grids of the tubes in stages (not shown) of the transmitter preceding the magnifier valve 1 at which modulation is effected. The potentiometer resistance with its associated tapping points and connections are designed to enable auto-absorber keying to be effected generally as set forth in our prior U. S. application No. 520,587, U. S. Patent No. 1,938,631, so that in the absence of speech there will be no rectified currents through the resistance 15 in the time control circuit, the grid of the keying or control tube 14 will be at cathode potential and the current flowing through the potentiometer resistance 12 will produce potentials sufficient to cut off an early or initial stage of the transmitter, the grids of the tubes in later stages being tapped upon this potentiometer resistance at points such that each stage draws no load current as large as the rating of the tube in that particular stage permits. At the commencement of speech the rectified current passes through the resistance 15 in the time control circuit, the keying tube is "blocked" and the current through the potentiometer 12 accordingly reduced to zero, so that the transmitter is changed over to the "marking" condition simultaneously with the arrival of speech voltages at the grid of the modulating tube. In this manner sufficient current is absorbed during no signals to regulate the load on the anode potential source. Now, so far as the control of the amplifier tube 1 is concerned, the difficulty arises that the auto-absorber action is nullified due to the presence of the source of potential 10. This source of potential is normally greatly in excess of and is additive to the bias derived from the potentiometer resistance 12. Therefore, with the arrangement illustrated in Figure 1, the amplifier valve 1, which is generally the final amplifier in the transmitter, or at any rate is late in the chain of amplification at the transmitter, would be biased to the "cut-off" condition at "spacing", and this is a serious disadvantage since, of course, if the tube 1 is the final amplifier, the usual case, it will normally be the largest tube in the transmitter and should produce by far the largest proportion of the load during spacing for proper auto-absorbed keying. This objection is so serious that it may in practice render the described system unworkable in some cases.

The object of the present invention is to avoid the aforementioned difficulty, and according to the said invention in a system wherein auto-absorber keying is employed and wherein an auxiliary source of potential is connected in the grid circuit of the tube at which modulation is to be effected, this auxiliary voltage is obtained by rectifying high frequency voltage derived from some convenent stage in the transmitter, preferably from the output of the amplifier stage preceding the stage at which modulation is effected. In this way the auxiliary voltage which may be referred to as the modulation correction voltage, is reduced to zero during spacing, since during spacing there will be no high frequency output from the penultimate amplifier stage, assuming the rectifier voltage to be derived from this stage, and accordingly the bias applied to the final amplifier stage, at which modulation is effected, will be that derived from the potentiometer resistance and therefore the said final amplifier stage will take its correct "no load" current during spacing.

One arrangement in accordance with this invention will now be described with reference to the accompanying Figure 2. In the arrangement now to be described, the modulation is effected at the final amplifier stage of the transmitter, which stage consists of two tubes 1a, 1b, symmetrically arranged. The grids of the two tubes are connected through the usual coupling condensers 19, 20 to the output terminals of the preceding amplifier, the said terminals being also connected preferably through variable coupling condensers 21, 22 to the plates 23, 24 of a pair of high frequency rectifiers, e. g., diodes 25, 26. The plates 23, 24 are connected together through a coil 27 and the center point 28 of this coil is connected through a resistance 29 shunted by a smoothing condenser 37 to the plate of the tube 5 and also to the midpoints of two resistances 30, 31, each of which is connected across the cathode of one of the diodes. The direct current output from the diodes may be varied if desired by changing the condensers 21 and 22 in capacity. A similar adjustment can be obtained by utilizing the resistance 29 as a potentiometer as indicated in broken lines in Figure 2, i. e., by connecting the anode of the tube 5 to an adjustable tapping point on resistance 29 instead of, as shown in full lines, to the lower end thereof.

The cathodes of the diodes are heated by alternating current through separate transformers, as shown, the secondary of one transformer being connected across the cathode of one diode and the secondary of the other being connected in series with a reactive impedance 32 across the cathode of the other diode. This arrangement has the advantage that the alternating currents heating the two diode cathodes are not in phase with one another and therefore variations of cathode temperature, due to alternating current heating do not occur in phase in the two diodes so that, as a result, constant modulation of the emitted carrier wave which might otherwise occur due to alternating current cathode heating in the diodes is avoided. A similar result may be achieved by heating the cathodes of the two diodes each from a different phase of a multi-phase supply.

The variable coupling condensers 21, 22 serve to regulate the amplitude of the rectifier voltage obtained from the diodes while the resistance 29 serves to provide a continuous load upon the diodes and thus to prevent voltage fluctuations as the resistance of the modulation tube varies in sympathy with the speech voltages applied to the grid. The grids of the tubes 1a, 1b are connected together through the grid coils 33, 34, the junction point of which is connected through a condenser to the common earthed point of the cathodes of the tubes 1a and 1b, said junction point being also connected to the cathode of the modulation tube 5. The cathode of this tube is connected through a resistance 36 to the midpoint of the inductance 27. Speech voltages are applied as before to the grid circuit of the modulation tube, and the anode 8 of this tube is connected to a tapping point 11 on a potentiometer resistance 12 in series with a source of potential 13 and the keying tube 14. Also, as before, the keying tube has a time control circuit 15, 16 connected between its grid and cathode and receiver rectified speech voltages, further tappings 17, 18 upon the potentiometer resistance 12 being taken to the grids of preceding stages in the transmitter. It will be seen that with this arrangement, modulation correction direct current voltage is derived from the rectifiers or diodes in dependence upon the high frequency output from the penultimate amplifier stage, and accordingly at spacing, when there is no high frequency output from this stage, there will be no modulation correction voltage, so that the total bias received by the final amplifier stage will be that obtained from the potentiometer resistance.

In operation high frequency oscillations are developed in the source of oscillations and amplified and applied by way of condensers 19 and 20 to the grids of the amplifiers 1a and 1b and from the anodes of these amplifiers to a load circuit. Radio frequency potentials are also supplied to the input electrodes of rectifiers 25 and 26, the outputs of which rectifiers are in series with the anode to cathode impedance of tube 5. The impedance of tube 5 is the "grid leak resistance" of the stage 1a and 1b in which modulation is to take place. When no modulating potentials are applied tube 14 is conductive and the potential drop through resistance 12 is applied to one or more of the early stages to bias the same to cutoff to stop transmission. In order to regulate the load on the anode source some of the later stages are caused to draw a certain amount of current even though the transmitter is in general in "no load" condition. Now the final stage usually includes higher power tubes and therefore should furnish a large part of this "no load" current, but heretofore due to the fact that the grid leak impedance (high impedance between anode and cathode of tube 5, Figure 1) is high at this time, the source 10 applies a high negative potential to tube 1 to completely cut off anode current thereto. In our improvement, however, 10 has been replaced by the rectifiers 25 and 26 which draw their energy from the radio frequency stages and the amplitude of the energy so drawn and the operating elements of the rectifiers are so adjusted that the final stage draws its share of "no load" current. Since at spacing or no modulation no energy is applied to the rectifiers 25 and 26 and there will be no modulation correction voltage applied from said rectifiers to the tube 5 and to the grid circuit of the tubes 1a and 1b.

When modulating potentials are applied, current flows through resistance 15, tube 14 becomes non-conductive, the potentials at the points along resistance 12 become more positive and the preceding stages in the transmitter become operative and a carrier wave is applied to the amplifiers 1a and 1b and to the rectifiers 25 and 26 which supply correcting current to the modulation circuits.

Having thus described our invention and the operation thereof, what we claim is:

1. In a signalling system, a source of carrier frequency oscillations, a thermionic amplifier tube having an anode, a cathode, and a control grid, a source of modulating potentials, a thermionic modulating tube having anode, cathode and control grid electrodes and having its control grid and cathode electrodes coupled to said source of modulating potentials and its anode and cathode electrodes connected in series with the control grid and cathode electrodes of said thermionic amplifier to modulate therein the carrier waves applied thereto when direct current potentials are applied between the anode and cathode and control grid and cathode of said tubes, and means for correcting the direct current potentials applied between the control grid and cathode of said thermionic amplifier comprising a rectifier having its input electrodes variably coupled to said source of high frequency oscillations and its output electrodes connected in series with the input electrodes to said thermionic modulator tube.

2. A transmitting device comprising, a source of high frequency oscillations, a pair of thermionic amplifier tubes, each of said tubes having an anode, a cathode and a control grid, circuits coupling the output of said source of high frequency oscillations to the control grids of said thermionic amplifier tubes, a source of modulating potentials, an additional thermionic tube having an anode, a cathode and a control grid, a connection between said source of modulating potentials and the control grid and cathode of said additional tube, a connection between the anode and cathode of said additional tube and the control grids and cathodes of said thermionic amplifiers, a source of biasing potential for said source of oscillations, said source of biasing potentials comprising a thermionic rectifier having its input electrodes connected with said source of modulating potentials and its output electrodes coupled to a potentiometer, a point on which is connected to said source of oscillations and a thermionic rectifier having its input electrodes coupled to said source of oscillations and its output electrodes connected with the anode and cathode of said additional tube.

3. A transmitting device comprising, a source of high frequency oscillations, a pair of thermionic amplifier tubes, each of said tubes having an anode, a cathode and a control grid, a high frequency amplifier having its input electrodes coupled to said source of high frequency oscillations and its output electrodes coupled to the control grids of said thermionic amplifier tubes, a source of modulating potentials, an additional thermionic tube having an anode, a cathode and a control grid, a connection between said source of modulating potentials and the control grid and cathode of said additional tube, a connection between the anode and cathode of said additional tube and the control grids and cathodes of said pair of thermionic amplifier tubes, said connection including a portion of a tapped resistance, a source of biasing potential for said source of oscillations and for said high frequency amplifier, said source of biasing potentials comprising a thermionic rectifier having its input electrodes connected with said source of modulating potentials and its output electrodes coupled to said resistance, points on which are connected to said source of oscillations and to said high frequency amplifier and a thermionic rectifier having its input electrodes coupled to said high frequency amplifier and its output electrodes connected in series with the anode and cathode of said additional tube.

4. A transmitting device comprising, a source of high frequency oscillations, a pair of thermionic amplifier tubes, each of said tubes having an anode, a cathode and a control grid, an additional amplifier having its input electrodes coupled to said source of high frequency oscillations and its output electrodes coupled to the control grids of said thermionic amplifier tubes, a source of modulating potentials, a modulating tube having an anode, a cathode and a control grid, a connection between said source of modulating potentials and the control grid and cathode of said modulating tube, a connection between the anode and cathode of said modulating tube and the control grids and cathodes of said thermionic amplifier tubes, a source of biasing potential for said source of oscillations and for said additional amplifier, said source of biasing potentials comprising a resistance points of which are connected to said source of oscillations and to said additional amplifier and a thermionic rectifier having its input electrodes coupled to said additional amplifier and its output electrodes connected with the anode and cathode of said modulating tube.

5. A signalling system comprising, a source of oscillations, a thermionic amplifier tube having a control grid and a cathode, a connection between said source of oscillations and the control grid of said amplifier tube, a source of modulating potentials, a thermionic modulating tube having its control grid electrode coupled to said source of modulating potentials and its cathode electrode coupled to the control grid in said thermionic amplifier and its anode coupled to the cathode of said amplifier tube to modulate therein the carrier waves applied thereto when the electrodes of said tubes are energized, a source of direct current potentials connected to the control grid of said amplifier tube, and a rectifier having its input electrodes coupled to said source of high frequency oscillations and its output electrodes coupled to the control grid of said thermionic amplifier tube to impress thereon a direct current correction voltage the value of which is a function of the amplitude of the high frequency oscillations of said source.

6. In a signalling system, a thermionic tube having an anode, a cathode and a control grid, a circuit for applying carrier wave energy to the control grid and cathode of said tube, a source of control potentials, a control tube having an anode, a cathode and a control grid, a circuit coupling said source of control potentials to the control grid and cathode of said control tube, means coupling the impedance between the anode and cathode of said control tube in a direct current circuit connected with the grid and cathode of said first named tube to control the potential of the grid of said first named tube relative to the cathode of said first named tube when current flows in said direct current circuit, a supplemental direct current circuit comprising the output electrodes of a rectifier connected with the grid and cathode of said first named tube to apply additional direct current potentials to said grid and cathode of said first named tube and a circuit for applying carrier wave energy to the input electrodes of said rectifier.

7. A signalling system as recited in claim 6 in which said first named direct current circuit includes a source of direct current potential.

8. A signalling system as recited in claim 6 in which said first named direct current circuit includes a source of direct current potential, the value of which varies in accordance with the mean amplitude of the control potentials.

FREDERICK CHARLES LUNNON.
EDWARD HERBERT TRUMP.